Figure 1:
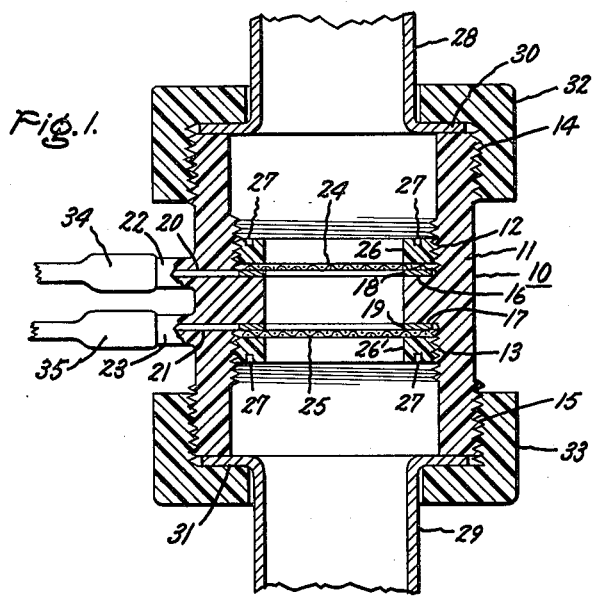

July 11, 1961  A. H. SHARBAUGH ET AL  2,992,406

PUMP

Filed Aug. 22, 1957

Inventors:
Amandus H. Sharbaugh,
Peter L. Auer,
by Paul A. Frank
Their Attorney.

United States Patent Office 2,992,406
Patented July 11, 1961

2,992,406
PUMP
Amandus H. Sharbaugh, Scotia, and Peter L. Auer, Schenectady, N.Y., assignors to General Electric Company, a corporation of New York
Filed Aug. 22, 1957, Ser. No. 679,574
3 Claims. (Cl. 336—57)

This invention relates to pumps for liquids. More particularly the invention relates to dielectric liquid pumps having no moving parts and to transformers containing pumps of this character.

The need for fluid pumps having low maintenance requirements has long been recognized. The ideal solution to the problem of a low maintenance pump, of course, is a pump having no moving parts. One of the best known pumps of this character is the type of pump which is used in pumping conducting liquids, such as liquid metals. Although pumps of this character are satisfactory for conducting liquids, they are of no use in the pumping of insulating or dielectric liquids. One solution to the problem of pumping dielectric liquids with a pump containing no moving parts is found in Chemical and Engineering News, May 14, 1956, vol. 34, No. 20, at pp. 2370 et seq. This dielectric pump comprises a pair of identical screen electrodes which are located in a conduit with a direct current potential between the electrodes. Although this pump operates satisfactorily, it suffers a major disadvantage in that it requires a high voltage source of direct current. Since high voltage direct current is not readily available in most locations, the use of this pump requires rectification apparatus which greatly increases the overall cost of pumping dielectric fluids.

It is an object of the present invention to provide a dielectric liquid pump containing no moving parts.

A further object of the present invention is to provide a dielectric liquid pump which is operable on alternating current.

A still further object of the present invention is to provide a transformer which contains cooling means including a dielectric fluid pump having no moving parts and being operable on alternating current.

These and other objects of our invention are accomplished by providing a dielectric pump comprising a conduit with two screen electrodes therein, with the first screen electrode being formed of a metal having a work function different from the work function of the second screen electrode. Upon application of an alternating current potential across these electrodes, the assembly will pump a dielectric liquid from one electrode to the other. The transformers of the present invention comprise the usual transformer structure with cooling conduits located externally of the transformer housing and with dielectric fluid pumps located in each of the cooling conduits, whereby upon the application of an alternating current potential to each of the dielectric pumps, the dielectric liquid in the transformer is circulated through the transformer and the external conduits. Heat transfer from the external conduits to the ambient atmosphere cools the dielectric liquid.

Figure 2:
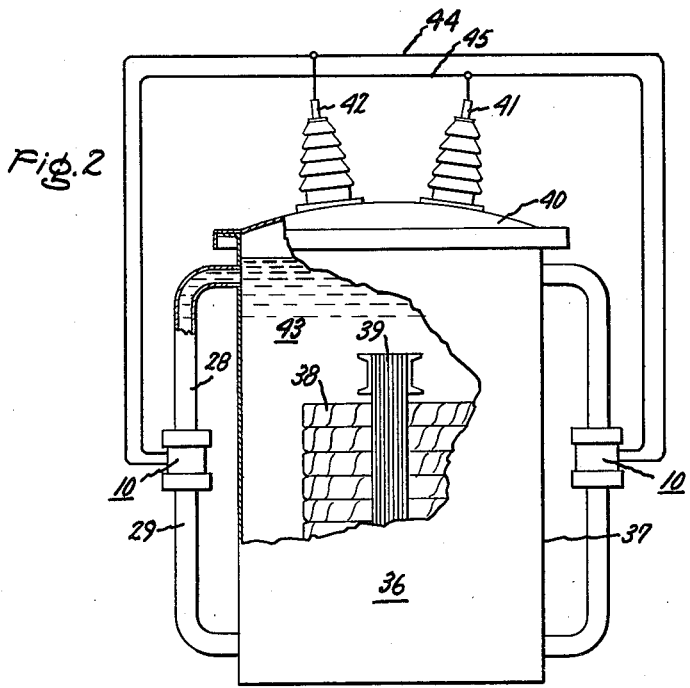

Our invention may be best understood by reference to the following description taken in connection with the drawings in which:

FIG. 1 is a view, partly in section, of a dielectric liquid pump of the present invention and FIG. 2 is a conventionalized view, partly in section, of a transformer containing a dielectric liquid pump.

In FIG. 1 the dielectric liquid pump is indicated generally at 10 and comprises a conduit 11 formed of any suitable insulating material such as glass or a plastic material, e.g., a phenol formaldehyde resin. Conduit 11 has internal threads 12 and 13 and external threads 14 and 15 with a raised interior portion defining shoulders 16 and 17. Annular conducting rings 18 and 19, which may be formed of copper, platinum or other conducting metal, are positioned adjacent shoulders 16 and 17, and are electrically connected to leads 20 and 21, which extend through the walls of conduit 11 and terminate in suitable terminals 22 and 23, which are fixed to the outside of conduit 11. Screen electrodes 24 and 25, which are positioned adjacent rings 18 and 19, are held in physical and electrical contact with rings 18 and 19 by means of annular fastening members 26 and 26' which are formed of metal or an insulating material and which are threaded into threads 12 and 13 of conduit 11. Detents 27 are provided in members 26 and 26' to facilitate the tightening of these members towards shoulders 16 and 17.

In the application of the dielectric liquid pump of the present invention, means are provided for attaching the pump to a line or conduit containing a dielectric liquid. This is accomplished by providing conduits 28 and 29, which carry a dielectric liquid, with flanges 30 and 31. These flanges are held against the ends of conduit 11 by threaded fastening members 32 and 33 which tightly hold flanges 30 and 31 in fluid-tight engagement with conduit 17. Members 32 and 33 can be formed of metal, glass, or plastic. With the arrangement shown in FIG. 1, a complete fluid-tight assembly is provided which is adaptable for the pumping of a dielectric liquid upon the application of an alternating current potential between electrodes 24 and 25. This alternating current potential is applied to the screens from a suitable source of alternating current potential (not shown) through conductors (not shown) attached to connectors 34 and 35 so that current flows through, for example, connector 34, terminal 22, lead 20, and ring 18 to screen 24.

In order for the dielectric fluid pump of the present invention to be operative, it is essential that screen electrodes 24 and 25 be formed of two different metals which have different work functions. The term "work function" is used in the present application in its usual sense to refer to the minimum amount of energy that must be imparted to an electron in the surface of a metal at absolute zero temperature in order to permit the electron to escape from the metal. These work functions, sometimes called photoelectric work functions or thermionic work functions, are described by Becker, J. A., Rev. Mod. Phys. 7, page 95 (1935) and a tabulation of work functions of a number of common metals is listed on page 123 of the Becker article.

Electrodes 24 and 25 have been described previously as screen electrodes. The term "screen" is intended to indicate that the electrodes contain a number of holes through which the dielectric fluid may flow. The term "screen" includes structures such as the conventional wire mesh woven screening, as well as perforated plates. The particular size and shape of electrodes 24 and 25 may vary within wide limits. Generally, however, it is preferred that these electrodes have a periphery which conforms generally to the shape of the conduit in which they are employed. Thus, since these electrodes are employed primarily in conduits having a circular cross-section, they are generally circular in shape. Desirably, the screen is of such a size as to substantially fill the conduit so that all fluid flowing in the conduit will flow through the screen. However, the pump of the present invention is still operative when the screen is smaller than the conduit. The thickness of the screen is completely immaterial to the present invention. The spacing between screen electrodes 24 and 25 may also vary within wide limits. Generally, however, the screens are positioned within one to ten millimeters of each other and are positioned in a plane perpendicular to the axis of the conduit, i.e., in a plane-to-plane symmetrical configuration whereby a substantially homogeneous field is formed by application of an alternating current potential.

The dielectric liquids which are pumped by the pump of the present invention are well known insulating fluids and are generally organic liquids. The term "dielectric liquid" is understood in the art to refer to a liquid having a resistivity of at least $10^{10}$ ohm-centimeters. Another characteristic of these dielectric liquids is that they have an intrinsic dielectric strength of about 1,000,000 volts per centimeter and in practice usually have an actual dielectric strength of about 50,000 volts per centimeter. Among the common dielectric liquids are hydrocarbons such as the normal alkanes having from 5 to 14 carbon atoms, branched-chain alkanes such as 2-methylpentane, 2,4-dimethylpentane, 2,2,4-trimethylpentane, etc.; mono-olefins containing from about 5 to 14 carbon atoms, aromatic hydrocarbons, such as benzene, methylbenzene, ethylbenzene, n-propylbenzene, isopropyl-benzene, n-butyl-benzene, t-butyl-benzene, as well as halogenated hydrocarbons, such as chlorobenzene, dichlorobenzenes, pentachlorodiphenyls, etc., nitrobenzene.

In the operation of the dielectric liquid pump of the present invention, it has been found that the velocity of the liquid being pumped is dependent on both the difference in the work functions of the two screen electrodes and on the potential difference between the two electrodes. The potential difference between the two electrodes can vary within a wide range so long as the potential does not exceed the potential at which dielectric breakdown of the liquid dielectric occurs. In practice it is found that breakdown of the liquid occurs at a potential below that predicted from its dielectric strength. This is due to field inhomogenieties caused by the screen electrodes. We have found, however, that no breakdown occurs with a potential difference between electrodes of less than about 14,000 volts R.M.S., per millimeter of electrode spacing. A satisfactory range of operating potential has been found to be from 1,000 to 10,000 volts, R.M.S. per millimeter of electrode spacing. And over this range, the velocity of the dielectric fluid being pumped is roughly proportional to the applied voltage. For a given electrode spacing and potential between electrodes, the volume of liquid pumped is proportional to the area of the electrodes.

Although we do not wish to be bound by theoretical considerations, it is believed that the applied potential between the electrodes causes the release of electrons from each electrode. A number of electrons proportional to the number released from each electrode is trapped in the liquid dielectric adjacent the particular electrode. Since the two screen electrodes have different work functions, the number of trapped electrodes adjacent the two electrodes will be different. This, in effect, results in a net negative charge in the dielectric liquid adjacent the electrode having the lower work function. During the portion of the alternating current cycle in which the electrode having the higher work function is positive with respect to the other electrode, there will be a tendency for the electrons to move from the low work function electrode to the high work function electrode. Since the electrons are trapped in the dielectric fluid, the fluid also tends to move from the area of the electrode having the low work function to the area having the higher work function.

The following description illustrates the preferred embodiment of our invention. Dielectric pump 10 of FIG. 1 was inserted between two conduits 28 and 29 which were connected to a reservoir of chlorobenzene. The entire assembly was arranged so that conduit 11, which was formed of glass, and conduits 28 and 29 were in a horizontal position with the entire assembly filled with chlorobenzene. Conduit 11 had an internal diameter of 1.0 inch and electrode 24 was formed of a circular aluminum 20 x 20 mesh screen. Electrode 25 was formed of a 20 x 20 mesh stainless steel screen. Aluminum has a work function of approximately three electron volts and stainless steel has a work function of approximately four electron volts. The diameter of screen electrodes 24 and 25 was 0.9 inch and the screens were separated by a distance of 2 millimeters. When an alternating current potential of 15,000 volts (R.M.S.) was applied between electrodes 24 and 25, the chlorobenzene was pumped from the aluminum screen electrode 24 to stainless steel electrode 25 with a linear velocity of the order of $2 \times 10^{-2}$ centimeters per second.

As is seen from the illustration of our invention above, the velocity of the dielectric liquid under the action of the pump is relatively small. However, for many applications, flow velocities of this order of magnitude are satisfactory.

In FIG. 2 is shown the application of the dielectric pump of the present invention in the circulation of the dielectric liquid contained in a transformer. In a cooling of transformer dielectric liquids, only a low velocity is required since the rate of heating of the dielectric fluid is not large and sufficient mass and heat transfer can be obtained by the application of the dielectric pump of this invention. In FIG. 2 is shown generally transformer 36 which comprises a fluid-tight tank or housing 37 encasing windings 38 and core piece 39. Tank 37 is provided with a removable cover 40 through which extend a plurality of electrical terminals, two of which are shown at 41 and 42. These external terminals are connected to windings 38 by conventional means (not shown). The entire tank 37 is filled with dielectric liquid 43. Extending vertically with respect to tank 37 are a plurality of cooling conduits through which the dielectric liquid may flow. Passage of the dielectric liquid, which becomes heated during the operation of the transformer, through these external cooling conduits allows heat to be dissipated from the fluid through the conduits to the ambient atmosphere. Each of these cooling conduits comprise an upper section 28 and a lower section 29 with dielectric liquid pump 10 connected between the sections of the conduit.

In the operation of the dielectric pump of the present invention in combination with transformer 36, an alternating current potential of suitable magnitude is applied to the screen electrodes of dielectric pump 10 and the electrodes are generally arranged so that the pumping action will cause the dielectric liquid to flow from section 28 towards section 29 of the cooling conduits. This provides for the removal of heated dielectric fluid from the upper portion of tank 37 and delivery of cooled dielectric liquid to the lower portion of tank 37. Although any source of alternating current potential may be employed for the operation of pump 10 in combination with transformer 36, it is convenient to supply the desired alternating current potential to electrodes 24 and 25 by connecting these electrodes to external terminals 41 and 42 of transformer 36 by means of leads 44 and 45. In this manner, the transformer 36 itself provides the alternating current potential required to operate dielectric liquid pump 10 and thus to cool dielectric liquid 43 continuously during the operation of the transformer.

Although the preferred embodiment of our invention has been disclosed, it will be understood that the invention is not limited to the exact disclosure shown, but that the elements of the invention may be widely modified within the spirit and scope defined by the appended claims.

What we claim as new and desire to secure by Letters Patent of the United States is:

1. A dielectric liquid pump comprising a conduit, a first metal screen electrode in said conduit, a second metal screen electrode in said conduit, whereby said electrodes are in a plane-to-plane symmetrical configuration, said first electrode being formed of a metal having a work function different from the work function of the metal forming said second electrode, whereby the application of an alternating current potential between said first electrode and said second electrode generates a substantially homogeneous field and causes the transport of a dielectric liquid in said conduit.

2. A dielectric fluid pump comprising a first metal screen electrode, a second metal screen electrode, means for positioning said first metal screen electrode in a plane perpendicular to the axis of said conduit, means for positioning the second electrode in a plane perpendicular to the axis of said conduit, the aforesaid electrodes being in a plane-to-plane symmetrical configuration, said first electrode being formed of a metal having a work function different from the work function of the metal forming said second electrode, and means for applying an alternating current potential between said first electrode and said second electrode whereby a substantially homogeneous field is generated.

3. In a transformer comprising a housing containing a core piece and a plurality of electrical windings immersed in a dielectric liquid, means for cooling said dielectric liquid, said means comprising at least one conduit positioned outside of said housing and in communication with said dielectric liquid and a dielectric liquid pump positioned in said conduit, said dielectric liquid pump comprising a first metal screen electrode, a second metal screen electrode, said electrodes being in a plane-to-plane symmetrical configuration, said first electrode being formed of a metal having a work function different from the work function of the metal forming said second electrode, and means for applying an alternating current potential between said electrodes, whereby the application of said alternating current potential effects generation of a substantially homogeneous field and causes the transport of dielectric fluid in said conduit.

References Cited in the file of this patent
UNITED STATES PATENTS

| | | |
|---|---|---|
| 1,980,521 | Hahn | Nov. 13, 1934 |
| 1,980,821 | Palueff | Nov. 13, 1934 |
| 2,195,431 | Shively et al. | Apr. 2, 1940 |
| 2,229,679 | Slayter | Jan. 28, 1941 |
| 2,239,695 | Bennett | Apr. 29, 1941 |
| 2,279,586 | Bennett | Apr. 14, 1942 |
| 2,305,500 | Slayter | Dec. 15, 1942 |
| 2,492,493 | Mission | Dec. 27, 1949 |
| 2,615,075 | Paluev | Oct. 21, 1952 |
| 2,615,940 | Williams | Oct. 28, 1952 |
| 2,636,664 | Hertzler | Apr. 28, 1953 |
| 2,748,356 | Kaehni | May 26, 1956 |
| 2,774,807 | Whitman | Dec. 18, 1956 |
| 2,851,618 | Krawinkel | Sept. 9, 1958 |